US012631985B2

(12) United States Patent
Hozumi

(10) Patent No.: US 12,631,985 B2
(45) Date of Patent: May 19, 2026

(54) IMAGE FORMING APPARATUS

(71) Applicant: Yoshiki Hozumi, Kanagawa (JP)

(72) Inventor: Yoshiki Hozumi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 18/675,751

(22) Filed: May 28, 2024

(65) Prior Publication Data

US 2024/0402627 A1 Dec. 5, 2024

(30) Foreign Application Priority Data

May 30, 2023 (JP) ................................ 2023-088509

(51) Int. Cl.
*G03G 15/01* (2006.01)
*G03G 15/00* (2006.01)

(52) U.S. Cl.
CPC ..... *G03G 15/0189* (2013.01); *G03G 15/5037* (2013.01); *G03G 2215/00632* (2013.01)

(58) Field of Classification Search
CPC ........... G03G 15/0189; G03G 15/1675; G03G 15/5037; G03G 2215/0122
See application file for complete search history.

(56) References Cited

U.S. PATENT DOCUMENTS

2008/0088883 A1* 4/2008 Yoshida ............ H04N 1/00901 358/300
2013/0266332 A1* 10/2013 Miyazaki .......... G03G 15/0189 399/66
2015/0378284 A1* 12/2015 Wada ................ G03G 15/1695 399/66
2017/0336738 A1* 11/2017 Ohta .................. G03G 15/1665
2020/0201212 A1* 6/2020 Minobe .............. G03G 15/1605
2023/0280678 A1* 9/2023 Yamamoto ............ G03G 15/16 399/66

FOREIGN PATENT DOCUMENTS

JP 2003-057969 A 2/2003
JP 2013-101195 A 5/2013
JP 2021-033243 A 3/2021

* cited by examiner

*Primary Examiner* — Carla J Therrien
(74) *Attorney, Agent, or Firm* — Harness, Dickey & Pierce, P.L.C.

(57) ABSTRACT

An image forming apparatus includes a plurality of image bearers, an intermediate transferor, a plurality of primary transferors, a primary transfer power source, a primary transfer current detector, and processing circuitry. The primary transferors primarily transfer toner images of colors from the image bearers onto the intermediate transferor. The intermediate transferor secondarily transfers the toner images onto a transfer medium. The primary transfer power source applies voltage to the primary transferors. The primary transfer current detector detects a current flowing through the primary transferors when a specified voltage is applied to the primary transferors and is connected to only one primary transferor of one color among all the colors. The processing circuitry determines a primary transfer voltage based on a current value detected by the primary transfer current detector and determines a primary transfer voltage value of the primary transferors of all the colors based on the detected current value.

20 Claims, 4 Drawing Sheets

| | PRIMARY TRANSFER BIAS |
|---|---|
| 0 ≤ X < F1 | Y1 |
| F1 ≤ X < F2 | Y2 |
| F2 ≤ X < F3 | Y3 |
| F3 ≤ X < F4 | Y4 |

X: DETECTION CURRENT
Y: PRIMARY TRANSFER BIAS

IMAGE FORMING APPARATUS

CROSS-REFERENCE TO RELATED APPLICATION

This patent application is based on and claims priority pursuant to 35 U.S.C. § 119(a) to Japanese Patent Application No. 2023-088509, filed on May 30, 2023, in the Japan Patent Office, the entire disclosure of which is hereby incorporated by reference herein.

BACKGROUND

Technical Field

Embodiments of the present disclosure relate to an image forming apparatus.

Related Art

An image forming apparatus (as an image forming apparatus and method capable of controlling a transfer bias applied to a transferor) is known that detects a voltage value of a transfer bias to be applied to the transferor such as a transfer roller when a recording medium is not positioned at a transfer section and determines a control target value of the transfer bias when the recording medium passes the transfer section based on a detection result of the voltage value of the transfer bias.

SUMMARY

In an embodiment of the present disclosure, an image forming apparatus includes a plurality of image bearers, a movable intermediate transferor, a plurality of primary transferors, a primary transfer power source, a primary transfer current detector, and processing circuitry. The plurality of image bearers carry toner images of a plurality of colors. The intermediate transferor secondarily transfers the toner images, which have been primarily transferred from the plurality of image bearers, onto a transfer medium. The plurality of primary transferors primarily transfer the toner images from the plurality of image bearers onto the intermediate transferor at primary transfer sections at which the plurality of image bearers contact an outer circumferential surface of the intermediate transferor. The primary transfer power source applies voltage to the plurality of primary transferors. The primary transfer current detector detects a current flowing through the plurality of primary transferors when a specified voltage is applied to the plurality of primary transferors and is connected to only one primary transferor corresponding to an image bearer of one color among the plurality of image bearers of all of the plurality of colors. The processing circuitry determines a primary transfer voltage based on a current value detected by the primary transfer current detector and determines a primary transfer voltage value of the plurality of primary transferors corresponding to all of the plurality of colors based on the detected current value.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
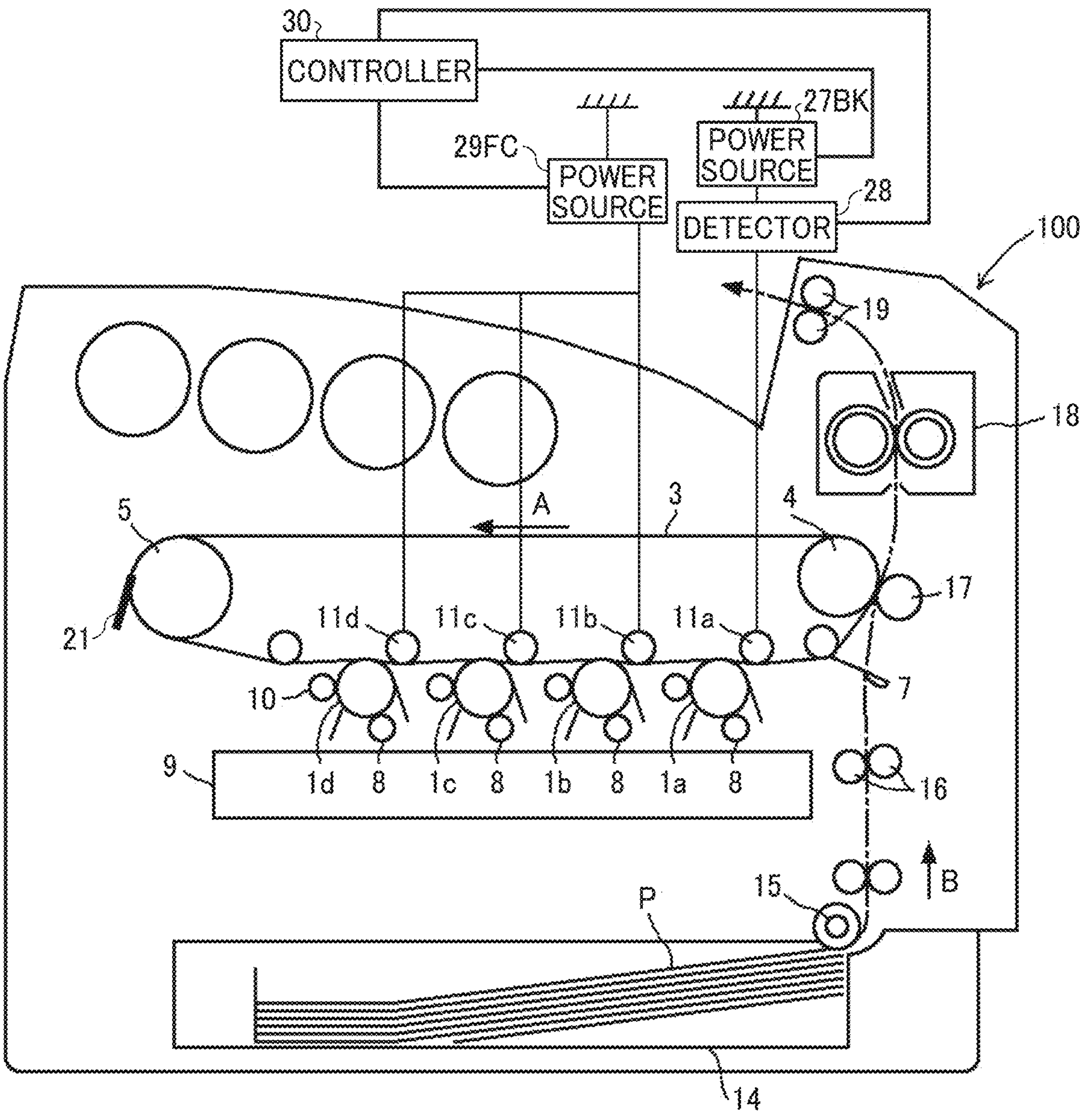
FIG. 1 is a schematic diagram illustrating an example of an image forming apparatus configured as a printer.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

FIG. 1 is a diagram illustrating an example of an image forming apparatus 100 configured as a printer. The image forming apparatus 100 illustrated in FIG. 1 is provided with a plurality of photoconductors (an example of image bearers), for example, first to fourth photoconductors 1*a*, 1*b*, 1*c*, and 1*d* (hereinafter, referred to as "photoconductor 1" as appropriate when colors are not distinguished) in FIG. 1 in a body of the image forming apparatus 100. Toner images in different colors are formed on the respective photoconductors. In the example illustrated in FIG. 1, a black toner image, a magenta toner image, a cyan toner image, and a yellow toner image are formed on the photoconductors 1*a*, 1*b*, 1*c*, and 1*d*, respectively. The photoconductors 1*a*, 1*b*, 1*c*, and 1*d* in FIG. 1 are drum-shaped photoconductors but may be endless-belt shaped photoconductor belts to rotate while being wound around multiple rollers.

An intermediate transfer belt 3 as an intermediate transfer member is disposed facing the first to fourth photoconductors 1*a*, 1*b*, 1*c*, and 1*d*. The photoconductors 1*a*, 1*b*, 1*c*, and 1*d* contact the surface of the intermediate transfer belt 3. The intermediate transfer belt 3 secondarily transfers toner images, which have been primarily transferred to the intermediate transfer belt 3 from the photoconductors 1*a*, 1*b*, 1*c*, and 1*d*, onto a transfer medium. The intermediate transfer belt 3 illustrated in FIG. 1 is wound around a drive roller 4, a tension roller 5, and an entrance roller 7. One of these support rollers, for example, the support roller 4 functions as a drive roller driven by a drive source. The intermediate transfer belt 3 is rotated by the drive of the drive roller in the direction illustrated by arrow A. The intermediate transfer belt 3 may include either a plurality of layers or a single layer. The plurality of layers preferably includes a base layer having an outer circumferential surface coated by a smooth coating layer made of, e.g., fluorine-based resin. The base layer may be made of, for example, a stretch-resistant fluororesin, polyvinylidene difluoride (PVDF) sheet, or polyimide resin. The single layer may be preferably made of, for example, PVDF, polycarbonate (PC), or polyimide.

The configuration for forming toner images on the photoconductors 1*a*, 1*b*, 1*c*, and 1*d* and the configuration for transferring the toner images onto the intermediate transfer belt 3 are all substantially the same, except the colors of the respective toner images formed on the photoconductors 1*a*, 1*b*, 1*c*, and 1*d*. Accordingly, a description is given of only the configuration and operation for forming a black toner image on the first photoconductor 1*a* and transferring the black toner image onto the intermediate transfer belt 3. The photoconductor 1*a* is rotated in a counterclockwise direction as indicated by the arrow A in FIG. 1. At this time, the surface of the photoconductor 1*a* is irradiated with light from a charge elimination device, so that the surface potential of the photoconductor 1*a* is initialized. The initialized surface of the photoconductor 1*a* is uniformly charged to a specified polarity, e.g., a negative polarity in this example by a charging device 8. The charged surface is irradiated with a light-modulated laser beam L emitted from an exposure device 9. As a result, electrostatic latent images corresponding to image data are formed on the surface of the photoconductor 1*a*. In the image forming apparatus 100 illustrated in FIG. 1, the exposure device 9 as a laser writing device that emits a laser beam is used. Alternatively, an exposure device having a light-emitting diode (LED) array and an imaging device can also be used.

The electrostatic latent image formed on the photoconductor 1*a* is visualized as a visible black toner image when the electrostatic latent image passes a developing device 10. On the other hand, inside the intermediate transfer belt 3, primary transfer rollers 11*a*, 11*b*, 11*c*, and 11*d* (hereinafter, referred to as a "primary transfer roller 11" as appropriate when colors are not distinguished) as primary transferors positioned substantially opposite to the photoconductors 1*a*, 1*b*, 1*c*, and 1*d* via the intermediate transfer belt 3 are arranged. The primary transfer roller 11 contacts the back surface of the intermediate transfer belt 3, so that an appropriate transfer nip between the photoconductor 1 and the intermediate transfer belt 3 is ensured. The primary transfer roller 11 is made of metal and is arranged with slight offset relative to the photoconductor 1 (an indirect transfer method). In the present embodiment, a belt distance (offset amount) between the photoconductor 1 and the primary transfer roller 11 in which the intermediate transfer belt 3 does not contact any of the photoconductor 1 and the primary transfer roller 11 is 4 to 5 mm.

A transfer voltage having a polarity (e.g., a positive polarity in this example) opposite to the toner charge polarity of the toner image formed on the photoconductor 1*a* is applied to the primary transfer roller 11*a*. Accordingly, a transfer electric field is formed between the photoconductor 1*a* and the intermediate transfer belt 3, and in the primary transfer section where the photoconductor 1*a* and the outer circumferential surface of the intermediate transfer belt 3 contact with each other, the toner image on the photoconductor 1*a* is electrostatically transferred onto the intermediate transfer belt 3 which is rotated in synchronization with the photoconductor 1*a* (primary transfer process). Untransferred toner adhering to the surface of the photoconductor 1*a* after the toner image is transferred to the intermediate transfer belt 3 is removed by a cleaning device, and the surface of the photoconductor 1*a* is cleaned.

In the same manner, a magenta toner image, a cyan toner image, and a yellow toner image are formed on the second to fourth photoconductors 1*b*, 1*c*, and 1*d*, respectively. The toner images of the respective colors are sequentially superimposed and electrostatically transferred onto the intermediate transfer belt 3 on which the black toner image is transferred.

The image forming apparatus 100 has two types of modes, which are a full-color mode in which four color toner images are used and a black monochrome mode in which a black toner image alone is used. In the full-color mode, the intermediate transfer belt 3 and the photoconductors 1 of four colors contact with each other, and toner of all four colors is transferred onto the intermediate transfer belt 3. On the other hand, in the black monochrome mode, only the black photoconductor 1*a* contacts the intermediate transfer belt 3 and only the black toner is transferred onto the intermediate transfer belt 3. At this time, the intermediate transfer belt 3 and the magenta, cyan, and yellow photoconductors 1*b*, 1*c*, and 1*d* are not in contact with each other, and the primary transfer rollers 11*b*, 11*c*, and 11*d* are separated from the photoconductors 1*b*, 1*c*, and 1*d* by a contact-and-separation mechanism included in the image forming apparatus 100.

In the image forming apparatus 100 according to the present embodiment, the primary transfer roller 11 contacts the inner circumferential surface of the intermediate transfer belt 3 such that a contact region between the photoconductor 1 and the intermediate transfer belt 3 and a contact region between the primary transfer roller 11 and the intermediate transfer belt 3 do not overlap each other in the moving direction of the intermediate transfer belt 3.

On the other hand, as illustrated in FIG. 1, a sheet feeding device 14 is disposed in a lower portion of the apparatus body, and the sheet feeding device 14 feeds a recording medium P made of, for example, a transfer paper in a direction indicated by arrow B by rotation of a sheet feed roller 15. The recording medium P that has been sent out is fed by a registration roller pair 16 at a specified timing to between a portion of the intermediate transfer belt 3 wound around the support roller 4 and a secondary transfer roller 17 as an example of a transfer device that is opposite the portion of the intermediate transfer belt 3. At this time, a specified transfer voltage is applied to the secondary transfer roller 17, and thus the composite toner image on the intermediate transfer belt 3 is secondarily transferred onto the recording medium P.

The recording medium P on which the composite toner image is secondarily transferred is further conveyed upward and passes a fixing device 18. At this time, the toner image on the recording medium P is fixed by the action of heat and pressure. The recording medium P that has passed the fixing device 18 is ejected to the outside of the image forming apparatus 100 via a sheet ejection roller pair 19 disposed in a sheet ejection section.

The untransferred toner adhering to the intermediate transfer belt 3 after transfer of the toner image is removed by a belt cleaner. The belt cleaner according to the present embodiment includes a cleaning blade 21 having a blade shape made of, for example, urethane. The cleaning blade 21 contacts the outer circumferential surface of the intermediate transfer belt 3 in a counter direction with respect to the moving direction of the intermediate transfer belt 3. As is clear to the person skilled in the art, various kinds of components can be used as the belt cleaner as appropriate, and for example, the belt cleaner may be a capacitance type.

The untransferred toner removed from the intermediate transfer belt 3 by the cleaning blade 21 is sent to the rear side in the longitudinal direction by a waste-toner coil in a cleaning case of the cleaning device, and is conveyed to a waste-toner container via a waste-toner passage disposed in the apparatus body.

FIG. 1 illustrates an example of a diagram of an applied power source used in the present embodiment. A primary-transfer-bias power source 27BK that is a primary transfer power source for applying a voltage to the primary transfer roller 11*a* is connected to a detector 28 and a controller 30. The detector 28 is connected to the primary-transfer-bias power source 27BK, the primary transfer roller 11*a*, and the controller 30. The detector 28 is connected to only the primary transfer roller 11*a* corresponding to the photoconductor 1*a* of one color (black in the present embodiment) of the photoconductors 1*a*, 1*b*, 1*c*, and 1*d* of all colors.

When the output of the primary-transfer-bias power source 27BK is under constant-voltage control, the detector 28 is a primary-transfer-current detector that detects the amount of current flowing through the primary transfer roller 11*a* when a bias is applied to the primary transfer roller 11*a*. When the output of the primary-transfer-bias power source 27BK is under constant-current control, the detector 28 detects an output bias of the primary-transfer-bias power source 27BK.

Voltages are applied to the other primary transfer rollers 11*b*, 11*c*, and 11*d* by another primary-transfer-bias power source 29FC. Accordingly, the image forming apparatus 100 includes a plurality of primary-transfer-bias power sources 27BK and 29FC, one of which is connected to the primary transfer roller 11*a* corresponding to the photoconductor 1*a* for the black toner image, and the detector 28 is also coupled only with the primary transfer roller 11*a* corresponding to the photoconductor 1*a* for the black toner image. As a result, the image forming apparatus 100 need only include one detector 28, which reduces the costs of the configuration of the intermediate transfer unit and the resistance detection configuration. Control for changing the target value of the transfer bias over time and every time the environment changes is unnecessary. Driving the intermediate transfer device and the image bearer each time is not necessary, so that the life of the intermediate transfer member and the image bearer can be extended.

The controller 30 is connected to the primary-transfer-bias power source 27BK, the primary-transfer-bias power source 29FC, and the detector 28, and determines the primary transfer voltage of the primary transfer roller 11*a* corresponding to all colors on the basis of a detection result by the detector 28, that is, the detection current value X detected by the detector 28.

Details of the embodiment of the present disclosure are described below with an example of the case where the primary-transfer-bias power source 27BK is under constant-voltage control. When the primary-transfer-bias power source 27BK is under constant-voltage control, the transfer ratio changes due to the resistance of the intermediate transfer belt 3, so that the optimum transfer voltage changes (see FIG. 2). For this reason, the primary-transfer-bias power source 27BK is corrected before printing.

Figure 2:
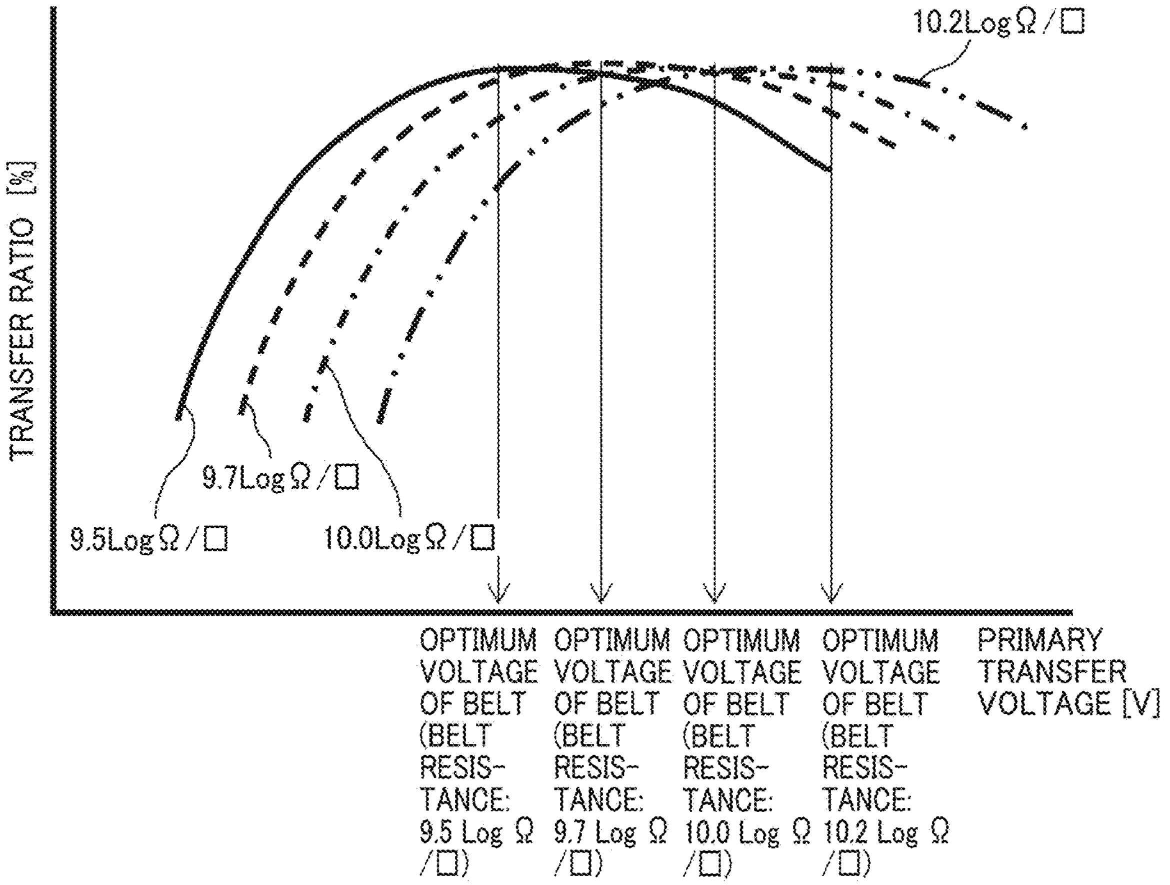
FIG. 2 is a graph of a relation between a primary transfer voltage and a transfer ratio.

FIG. 2 is a graph of a relation between the primary transfer voltage and the transfer ratio. The resistance of the intermediate transfer belt 3 changes to 9.5 Log Ω/□, 9.7 Log Ω/□, 10.0 Log Ω/□, and 10.2 Log Ω/□, so that the optimum transfer voltage also changes as indicated by the four arrows.

Figure 3:
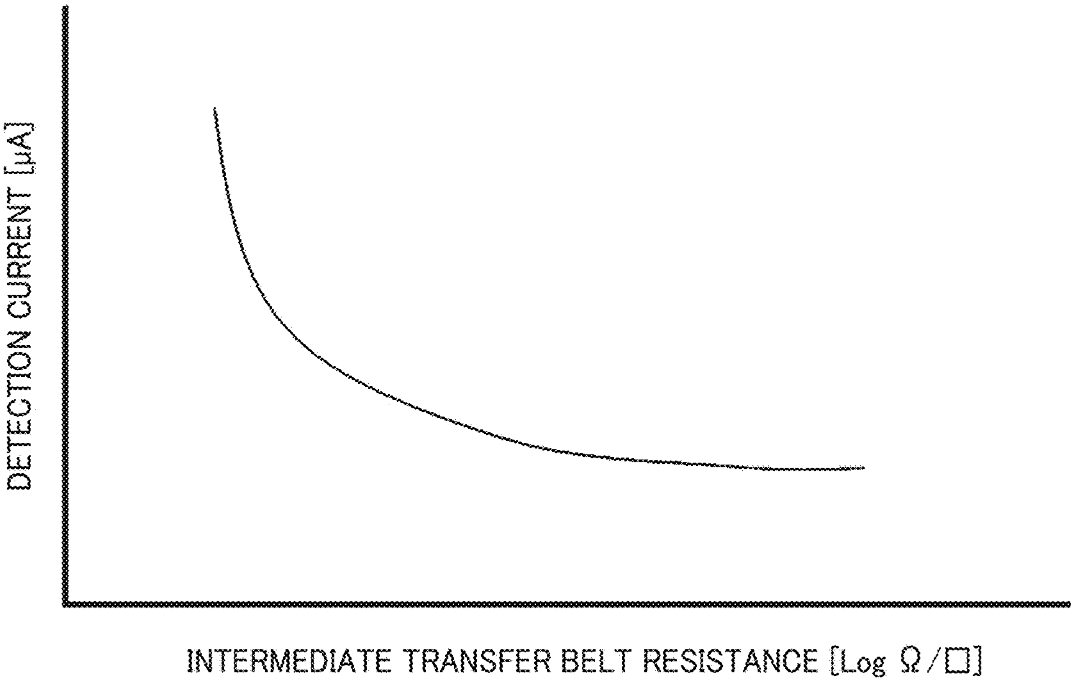
FIG. 3 is a graph of a relation between an intermediate-transfer-belt resistance value and a detection current.

An intermediate-transfer-belt resistance value is estimated on the basis of an average current value detected by the detector 28 when a specified bias (2000V) is applied to the primary transfer roller 11*a* from the primary-transfer-bias power source 27BK for black over about one turn of the intermediate transfer belt 3, and then a voltage value to be applied to the primary transfer roller 11*a* is determined. FIG. 3 is a graph of a relation between the resistance value of an intermediate transfer belt and the detection current, and as illustrated in FIG. 3, as the detection current increases, the belt resistance decreases.

At this time, the intermediate-transfer-belt resistance value is estimated by the primary-transfer-bias power source 27BK for black and the detector 28. The value of the primary-transfer-bias power source 29FC to be applied to the other three colors are also determined on the basis of the result by the detector 28. From the data of the intermediate-transfer-belt resistance value and the transfer ratio in FIG. 2 and the data of the intermediate-transfer-belt resistance value and the detection current in FIG. 3, the intermediate-transfer-belt resistance value is estimated from the detected current value, the optimal primary transfer voltage value at the intermediate-transfer-belt resistance value is calculated, and the primary transfer bias of the primary-transfer-bias power source 27BK is corrected.

Figures 4, 5:
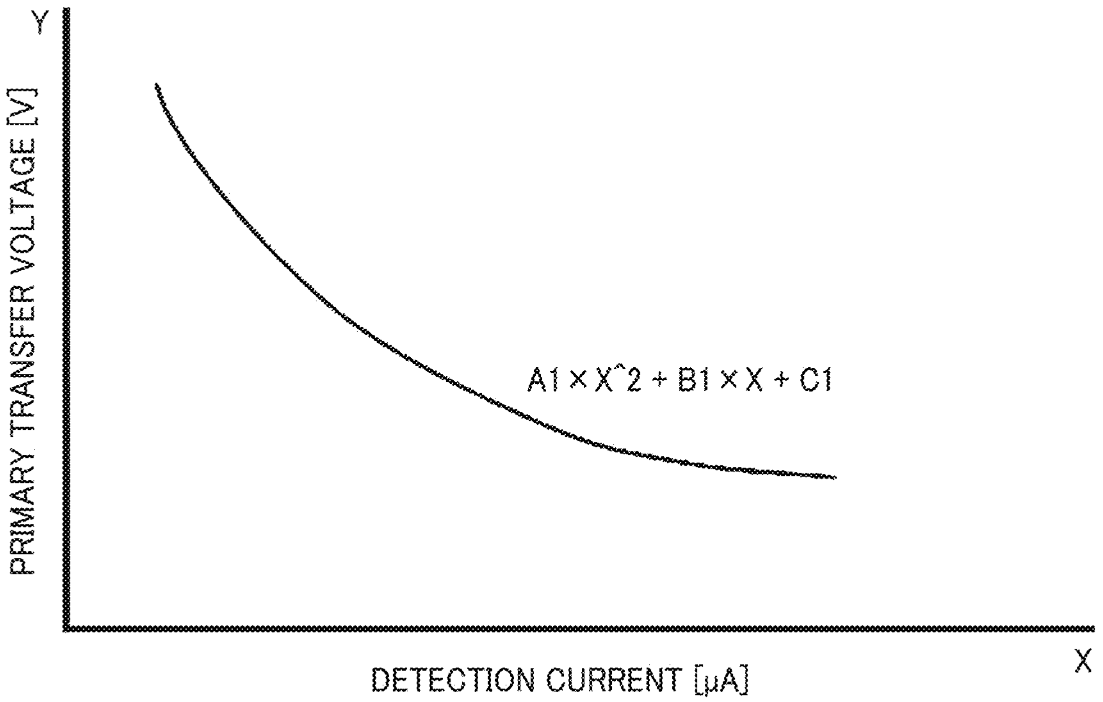
FIG. 4 is a table of a relation between a detection current value X and a primary transfer bias Y.
FIG. 5 is a graph of a conversion formula between a detection current value X and a primary transfer bias Y.

A plurality of methods for correcting the primary transfer bias by the detected current value are possible depending on the apparatus. First, as illustrated in FIG. 4, there is a method in which a fixed value of a primary transfer bias Y (also referred to as a "primary transfer voltage value Y") is determined according to the magnitude of a detection current value X (also referred to as a "detected current value X"). The magnitude of the detection current value X is divided into four ranges in the bias table of FIG. 4, and four primary transfer biases Y1, Y2, Y3, and Y4 corresponding to the four ranges are defined. The bias table is stored in a memory of the image forming apparatus 100. By using this method, the controller 30 may only select one of four fixed values as the primary transfer bias Y according to the magnitude of the detection current value X, and thus the control for correction of the primary transfer bias Y can be simplified.

As illustrated in FIG. 5, there is also a method in which the detection current value X is included in a conversion formula to calculate the primary transfer bias Y. In other words, the primary transfer voltage value Y is determined by a conversion formula using the detection current value X as a variable. According to this method, the controller 30 can more finely determine the optimum primary transfer bias value corresponding to the variation of the resistance value of the intermediate transfer belt 3.

The present inventor has verified conversion formulae and has found that the best fit is obtained by using a quadratic function as the conversion formula. It is conceivable that the optimum conversion formula changes depending on conditions around the primary transfer section, for example, the distance between the photoconductor 1 and the primary transfer roller 11, the resistance value of the intermediate transfer belt 3 to be used, and the type of toner.

One example of the conversion formula for the detection current value X [μA] and the primary transfer bias Y [V] is $Y=A1\times X^2+B1\times X+C1$ ($A1\neq 0$). In other words, the conversion formula for the primary transfer bias Y is a quadratic function with the detection current value X as independent variable. Here, it is assumed that A1=0.5, B1=77, and C=3700. When X=50 [μA], Y=1100 [V] is satisfied. According to this method, the controller 30 can more finely determine the optimum primary transfer bias Y corresponding to the variation of the resistance value of the intermediate transfer belt.

Figure 6:
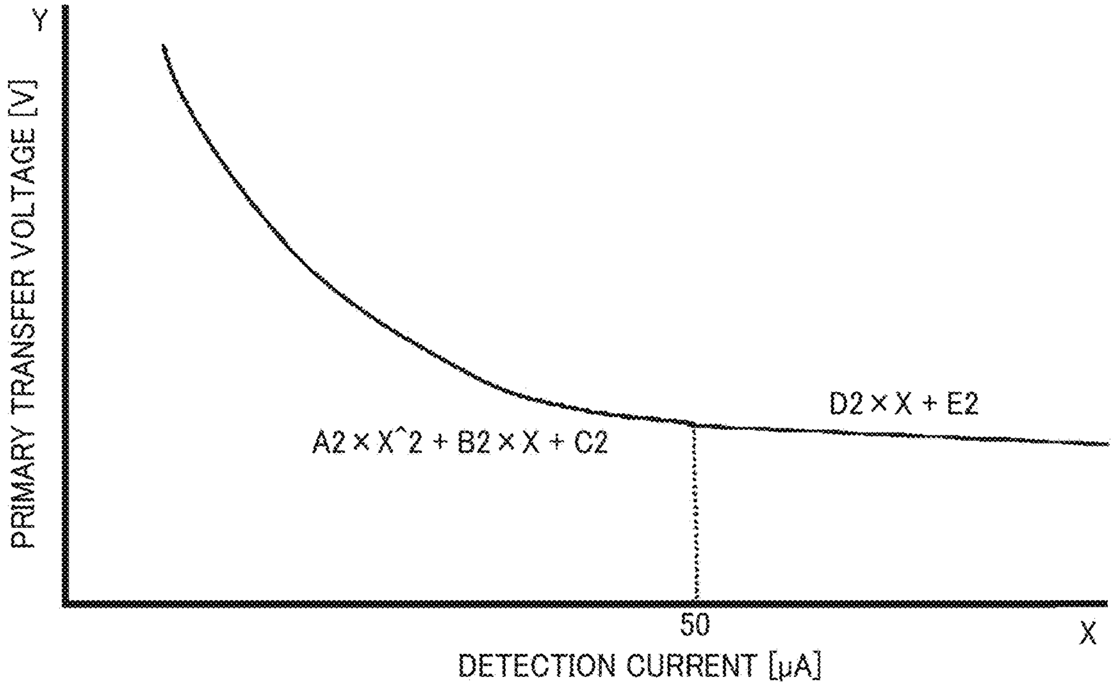
FIG. 6 is a graph of another conversion formula between a detection current value X and a primary transfer bias Y.

As illustrated in FIG. 6, a conversion formula may be changed according to the range of the detection current value X that is detected. According to this method, the control for correction of the primary transfer bias by the controller 30 turns to be complicated. However, a more appropriate primary transfer bias Y can be obtained.

Another example of the conversion formula for the detection current value X [μA] and the primary transfer bias Y [V] is as below;

when X<50 [μA], $Y=A2\times X^2+B2\times X+C2$ (A2≠0); and when X≥50 [μA], $Y=D2\times X+E2$ (D2≠0).

In other words, the conversion formula for the primary transfer bias Y is determined by a plurality of conversion formulae according to the magnitude of the detection current value X and using the detection current value X as a variable. Here, it is assumed that A2=0.5, B2=−77, C2=3700, D2=−22, and E2=2200. As a result, when X=60 [μA], Y=880 [V] is satisfied. According to this method, the controller 30 can more finely determine the optimum primary transfer bias value corresponding to the variation of the resistance value of the intermediate transfer belt 3.

Figure 7:
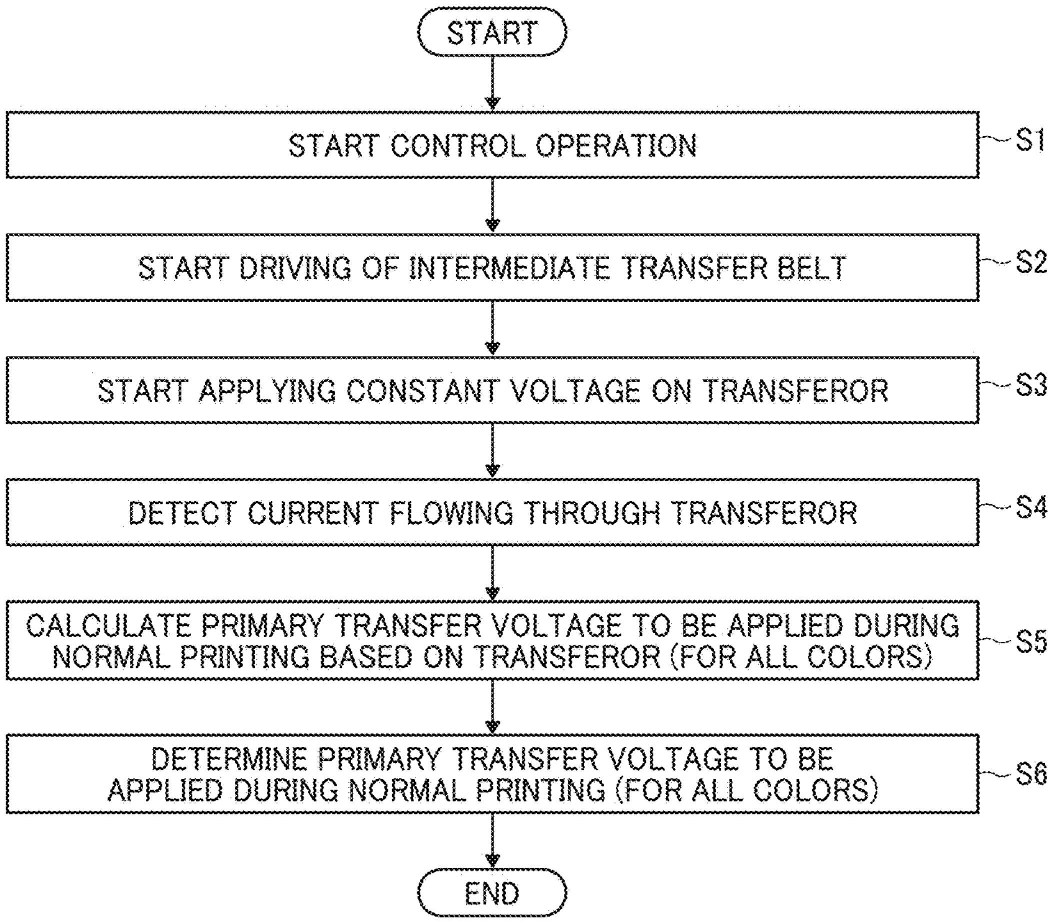
FIG. 7 is a flowchart of a method for determining a primary transfer voltage according to an embodiment of the present disclosure.

FIG. 7 is a flowchart of a method for determining a primary transfer voltage according to an embodiment of the present disclosure. In the image forming apparatus 100, when the control operation is started in step S1, in step S2, the intermediate transfer belt 3 is driven. In step S3, the controller 30 applies a constant voltage to the primary transfer roller 11. In the present embodiment, a primary transfer roller to which a voltage is applied is the primary transfer roller 11*a*. However, another primary transfer roller may be used. In step S4, the detector 28 detects a current flowing through the primary transfer roller 11. In step S5, the controller 30 calculates a primary transfer voltage to be applied in normal printing based on the detection current (detection current value X). The primary transfer voltage is a primary transfer voltage value for the primary transfer rollers 11*a*, 11*b*, 11*c*, and 11*d* corresponding to all colors. Thus, in step S6, the primary transfer voltage to be applied in normal printing is determined.

In a case where the intermediate-transfer-belt resistance value hardly changes over time, the above-described correction control of the primary transfer bias may be performed only when the intermediate transfer belt unit is started to use. In this case, a minimum travel amount is required without unnecessarily moving the intermediate transferor and the image bearer, and thus the life of other components can be extended.

In the above-described embodiment, the standard primary transfer bias Y is calculated using the above-described conversion formula. However, the primary transfer bias Y to be actually applied is determined by further multiplying the detection current value X by a correction coefficient of the use environment and the belt linear speed depending on the use environment and the belt linear speed (paper type or mode).

As described above, in the image forming apparatus 100 according to an embodiment of the present disclosure, the transferor is formed by the indirect transfer method with less increase of resistance, and only one detector 28 is disposed to detect the value of the current flowing through the primary transfer roller 11 when a constant voltage is applied to the primary transfer roller 11 from the primary-transfer-bias power source 27BK. The primary transfer bias Y corresponding to all colors is determined based on the detection current result, so that cost reduction of the configuration of the intermediate transfer unit and the configuration of resistance detection can be achieved.

Aspects of the present disclosure are, for example, as follows.

First Aspect

An image forming apparatus (e.g., the image forming apparatus 100) includes a plurality of image bearers (e.g., the photoconductors 1*a*, 1*b*, 1*c*, and 1*d*), a movable intermediate transferor (e.g., the intermediate transfer belt 3), a plurality of primary transferors (e.g., the primary transfer rollers 11*a*, 11*b*, 11*c*, and 11*d*), a primary transfer power source (e.g., the primary-transfer-bias power source 27BK, the primary-transfer-bias power source 29FC), a primary transfer current detector (e.g., the detector 28), and a controller (e.g., the controller 30). The plurality of image bearers carry toner images of a plurality of colors. The intermediate transferor secondarily transfers the toner images, which have been primarily transferred from the plurality of image bearers, onto a transfer medium. The plurality of primary transferors primarily transfer the toner images from the plurality of image bearers onto the intermediate transferor at primary transfer sections at which the plurality of image bearers contact an outer circumferential surface of the intermediate transferor. The primary transfer power source applies voltage to the plurality of primary transferors. The primary transfer current detector detects a current flowing through the plurality of primary transferors when a specified voltage is applied to the plurality of primary transferors. The controller determines a primary transfer voltage based on a current value detected by the primary transfer current detector. The primary transfer current detector is connected to only one primary transferor corresponding to an image bearer of one color among the plurality of image bearers of all of the plurality of colors. The controller determines a primary transfer voltage value (e.g., the primary transfer voltage value Y) of the plurality of primary transferors corresponding to all of the plurality of colors based on the detected current value.

Second Aspect

In the image forming apparatus (e.g., the image forming apparatus 100) according to the first aspect, one of a plurality of primary transfer power sources including the primary transfer power source (e.g., the primary-transfer-bias power source 27BK, the primary-transfer-bias power source 29FC) is connected to one of the plurality of primary transferors (e.g., the primary transfer rollers 11*a*, 11*b*, 11*c*, and 11*d*) corresponding to one of the plurality of image bearers (e.g., the photoconductors 1*a*, 1*b*, 1*c*, and 1*d*) for a black toner image, and the primary transfer current detector (e.g., the detector 28) is also connected to the one of the plurality of primary transferors (e.g., the primary transfer rollers 11*a*, 11*b*, 11*c*, and 11*d*) corresponding to the one of the plurality of image bearers for the black toner image.

Third Aspect

In the image forming apparatus (e.g., the image forming apparatus 100) according to the first or second aspect, the primary transfer voltage value (e.g., the primary transfer voltage value Y) is determined from a plurality of fixed values corresponding to magnitudes of the detected current value.

Fourth Aspect

In the image forming apparatus (e.g., the image forming apparatus 100) according to the first or second aspect, the primary transfer voltage value (e.g., the primary transfer voltage value Y) is determined by a conversion formula using the detected current value as a variable.

Fifth Aspect

In the image forming apparatus (e.g., the image forming apparatus 100) according to the fourth aspect, the conversion formula for the primary transfer voltage value (e.g., the primary transfer voltage value Y) is a quadratic function with the detected current value as an independent variable.

Sixth Aspect

In the image forming apparatus (e.g., the image forming apparatus 100) according to the fifth aspect, the quadratic function is represented by $Y=A1\times X^2+B1\times X+C1$ ($A1\neq 0$), where the primary transfer voltage value is Y [V] and the detected current value is X [μA].

Seventh Aspect

In the image forming apparatus (e.g., the image forming apparatus 100) according to any one of the first to sixth aspects, the primary transfer voltage value (e.g., the primary transfer voltage value Y) is determined by a plurality of conversion formulae corresponding to magnitudes of the detected current value and using the detected current value as a variable.

Eighth Aspect

In the image forming apparatus (e.g., the image forming apparatus 100) according to the seventh aspect, the plurality of conversion formulae are represented by $Y=A2\times X^2+B2\times X+C2$ when $X<\alpha$, and $Y=D2\times X+E2$ when $X\geq\alpha$, where the primary transfer voltage value (e.g., the primary transfer voltage value Y) is Y [V], the detected current value is X [μA], $\alpha>0$, $A2\neq 0$, and $D2\neq 0$.

Ninth Aspect

In the image forming apparatus (e.g., the image forming apparatus 100) according to any one of the first to eighth aspects, the plurality of primary transferors (e.g., the primary transfer rollers 11*a*, 11*b*, 11*c*, and 11*d*) contact an inner circumferential surface of the intermediate transferor (e.g., the intermediate transfer belt 3) such that a contact region between the intermediate transferor and each of the plurality of image bearers (e.g., the photoconductors 1*a*, 1*b*, 1*c*, and 1*d*) and a contact region between the intermediate transferor and each of the plurality of primary transferors do not overlap each other in a moving direction of the intermediate transferor.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. An image forming apparatus comprising:

a plurality of image bearers to carry toner images of a plurality of colors;

a movable intermediate transferor to secondarily transfer the toner images, which have been primarily transferred from the plurality of image bearers, onto a transfer medium;

a plurality of primary transferors to primarily transfer the toner images from the plurality of image bearers onto the movable intermediate transferor at primary transfer sections at which the plurality of image bearers contact an outer circumferential surface of the movable intermediate transferor;

two primary transfer power sources to apply voltage to the plurality of primary transferors, the two primary transfer power sources including:

a first primary transfer power source coupled to a first primary transferor corresponding to a first image bearer for a black toner image; and a second primary transfer power source coupled to second primary transferors corresponding to second image bearers for color toner images of three colors other than black;

a primary transfer current detector to detect a current flowing through the first primary transferor and the second primary transferors during a time a specified voltage is applied to the first primary transferor and the second primary transferors; and processing circuitry configured to determine a primary transfer voltage value based on a current value detected by the primary transfer current detector.

2. The image forming apparatus according to claim 1, further comprising a plurality of primary transfer power sources, wherein the primary transfer current detector is coupled to the first primary transferor corresponding to the first image bearer for the black toner image.

3. The image forming apparatus according to claim 1, wherein the processing circuitry is configured to determine the primary transfer voltage value from a plurality of fixed values corresponding to magnitudes of the current value detected by the primary transfer current detector.

4. The image forming apparatus according to claim 1, wherein the processing circuitry is configured to determine the primary transfer voltage value by a plurality of conversion formulae corresponding to magnitudes of the current value detected by the primary transfer current detector and using the current value detected by the primary transfer current detector as a variable.

5. The image forming apparatus according to claim 4, wherein the plurality of conversion formulae are represented by $Y=A2\times X^2+B2\times X+C2$ when $X<\alpha$, and $Y=D2\times X+E2$ when $X\geq\alpha$, where the primary transfer voltage value is Y [V], the current value detected by the primary transfer current detector is X [μA], $\alpha>0$, $A2\neq 0$, and $D2\neq 0$.

6. The image forming apparatus according to claim 1, wherein the plurality of primary transferors contact an inner circumferential surface of the movable intermediate transferor such that a first contact region between the movable intermediate transferor and each of the plurality of image bearers and a second contact region between the movable intermediate transferor and each of the plurality of primary transferors are spaced apart in a moving direction of the movable intermediate transferor.

7. An image forming apparatus comprising:

a plurality of image bearers to carry toner images of a plurality of colors;

a movable intermediate transferor to secondarily transfer the toner images, which have been primarily transferred from the plurality of image bearers, onto a transfer medium;

a plurality of primary transferors to primarily transfer the toner images from the plurality of image bearers onto the movable intermediate transferor at primary transfer sections at which the plurality of image bearers contact an outer circumferential surface of the movable intermediate transferor;

a primary transfer power source to apply voltage to the plurality of primary transferors;

a primary transfer current detector to detect a current value representing an amount of current flowing through the plurality of primary transferors when a specified voltage is applied to the plurality of primary transferors; and processing circuitry configured to:

apply a constant voltage to the plurality of primary transferors by the primary transfer power source; and determine a primary transfer voltage value by substituting a constant current value detected by the primary transfer current detector as a variable into a conversion formula for calculating the primary transfer voltage value.

8. The image forming apparatus according to claim 7, wherein the conversion formula for the primary transfer voltage value is a quadratic function with the current value detected by the primary transfer current detector as an independent variable.

9. The image forming apparatus according to claim 8, wherein the quadratic function is represented by $Y=A1\times X^2+B1\times X+C1$ ($A1\neq 0$), where the primary transfer voltage value is Y [V] and the current value detected by the primary transfer current detector is X [μA].

10. The image forming apparatus according to claim 7, further comprising a plurality of primary transfer power sources including the primary transfer power source, wherein one of the plurality of primary transfer power sources is coupled to a first primary transferor corresponding to a first image bear for a black toner image, and wherein the primary transfer current detector is coupled to the first primary transferor.

11. The image forming apparatus according to claim 7, wherein the processing circuitry is configured to determine the primary transfer voltage value by a plurality of conversion formulae corresponding to magnitudes of the current value detected by the primary transfer current detector and using the current value detected by the primary transfer current detector as a variable.

12. The image forming apparatus according to claim 11, wherein the plurality of conversion formulae are represented by $Y=A2\times X^2+B2\times X+C2$ when $X<\alpha$, and $Y=D2\times X+E2$ when $X\geq\alpha$, where the primary transfer voltage value is Y [V], the current value detected by the primary transfer current detector is X [μA], $\alpha>0$, $A2\neq 0$, and $D2\neq 0$.

13. The image forming apparatus according to claim 7, wherein the plurality of primary transferors contact an inner circumferential surface of the movable intermediate transferor such that a first contact region between the movable intermediate transferor and each of the plurality of image bearers and a second contact region between the movable intermediate transferor and each of the plurality of primary transferors are spaced apart in a moving direction of the movable intermediate transferor.

14. The image forming apparatus according to claim 7, wherein the processing circuitry is configured to determine the primary transfer voltage value from a plurality of fixed values corresponding to magnitudes of the current value detected by the primary transfer current detector.

15. The image forming apparatus according to claim 1, wherein the primary transfer current detector is coupled to only one primary transferor corresponding to one image bearer of one color among the plurality of image bearers.

16. The image forming apparatus according to claim 1, wherein the processing circuitry is configured to determine a primary transfer voltage value of the plurality of primary transferors corresponding to all of the plurality of colors based on the current value detected by the primary transfer current detector.

17. An image forming apparatus comprising:

a plurality of image bearers to carry toner images of a plurality of colors;

a movable intermediate transferor to secondarily transfer the toner images, which have been primarily transferred from the plurality of image bearers, onto a transfer medium;

a plurality of primary transferors to primarily transfer the toner images from the plurality of image bearers onto the movable intermediate transferor at primary transfer sections at which the plurality of image bearers contact an outer circumferential surface of the movable intermediate transferor;

two primary transfer power sources to apply voltage to the plurality of primary transferors, the two primary transfer power sources including:

a first primary transfer power source coupled to a first primary transferor corresponding to a first image bearer for a black toner image; and a second primary transfer power source coupled to second primary transferors corresponding to second image bearers for color toner images of three colors other than black;

a primary transfer current detector to detect a current flowing through the first primary transferor when a specified voltage is applied to at least one of the plurality of primary transferors; and processing circuitry configured to apply a constant voltage to the first primary transferor by the first primary transfer power source, and determine a primary transfer voltage value by substituting a constant current value detected by the primary transfer current detector as a variable into a conversion formula for calculating the primary transfer voltage value.

18. The image forming apparatus according to claim 17, further comprising a plurality of primary transfer power sources including the two primary transfer power sources, wherein one of the plurality of primary transfer power sources is coupled to a first primary transferor corresponding to a first image bear for a black toner image, and wherein the primary transfer current detector is coupled to the first primary transferor.

19. The image forming apparatus according to claim 17, wherein the processing circuitry is configured to determine the primary transfer voltage value by a plurality of conversion formulae corresponding to magnitudes of a current value detected by the primary transfer current detector and using the current value detected by the primary transfer current detector as a variable.

20. The image forming apparatus according to claim 19, wherein the plurality of conversion formulae are represented by $Y=A2\times X^2+B2\times X+C2$ when $X<a$, and $Y=D2\times X+E2$ when $X>a$, where the primary transfer voltage value is Y[V], the current value detected by the primary transfer current detector is X[μA], $a>0$, $A2\neq 0$, and $D2\neq 0$.

* * * * *